United States Patent [19]

Morse et al.

[11] 4,396,131

[45] Aug. 2, 1983

[54] VENDING MACHINE FOR BEVERAGE CUPS HAVING A SOLUBLE COMPONENT

[76] Inventors: Milton Morse, Fort Lee, N.J.; APM Corporation, 02, Englewood, N.J.

[21] Appl. No.: 243,501

[22] Filed: Mar. 13, 1981

Related U.S. Application Data

[63] Continuation-in-part of Ser. No. 768,991, Feb. 16, 1977, abandoned.

[51] Int. Cl.³ .............................................. B23Q 7/04

[52] U.S. Cl. .................................... 221/220; 221/262

[58] Field of Search .......................... 221/92, 217–220, 221/213–215, 262

[56] References Cited

U.S. PATENT DOCUMENTS 2,059,546 11/1936 Brandenburg ...................... 221/220

3,058,614 10/1962 Marasso .......................... 221/220 X

*Primary Examiner*—Stanley H. Tollberg

*Attorney, Agent, or Firm*—Weingram & Klauber

[57] ABSTRACT

A vending machine capable of dispensing individual beverage cups incorporating a soluble component, selectively from one of a plurality of stacks, each stack containing cups having a particular type of soluble component. The cups are positioned in inverted position within a stack, and are dispensed in such inverted position from the top of the stack. A claw mechanism, selectively positionable along a horizontal track which is tiltable about its own horizontal axis for actuating the claw mechanisms, is employed to engage a cup which is delivered to a chute structure carrying the same to a location where it may be manually engaged for subsequent filling with a liquid. With the removal of a cup from the top of a given stack, the stack is elevated to position the next succeeding cup of the stack within the path of movement of the claw mechanism, so that the operation may be repeated.

12 Claims, 6 Drawing Figures

VENDING MACHINE FOR BEVERAGE CUPS HAVING A SOLUBLE COMPONENT

This application is a continuation-in-part of application Ser. No. 768,991, filed Feb. 16, 1977, now abandoned.

BACKGROUND OF THE INVENTION

This invention relates generally to the field of beverage vending machines, and more particularly to a device of this type adapted to dispense a dry beverage cup having a fluid soluble component which is dissolved with the addition of a hot or cold liquid which may be independently supplied by the user.

It is known in the art to provide mechanisms for feeding an empty cup under the action of gravity to a filling station where the contents, such as coffee, sugar, cream and the like are added, following which the cup is manually removed from the device for subsequent consumption of the contents. Such devices, while not without substantial utility, do suffer from many disadvantages, in the nature of mechanical complexity, relatively limited choice of selected beverage, the requirement of plumbing connections, and the like. Because of such mechanical complexity, servicing intervals are relatively frequent, and customer dissatisfaction with frequent malfunctions is widespread.

The concept of a soluble food or beverage component positioned within the interior of a cup is well known in the art, and it is also known to nest such cups in such manner that the soluble component lies in the space immediately above the bottom wall of a cup which is enclosed upon the formation of a stack. It is further known to provide a soluble or otherwise removable membrane to cover the soluble product until used. However, in order to maintain the interior of the cup in sanitary condition, it is necessary to seal, in some manner, the open end of the cup to the outer surface of the cup nested therein. As a result, considerable force is necessary to break this seal, a requirement which does not lend itself to mechanical dispensing, under the force of gravity, from the bottom of a stack of cups as in known beverage dispensing devices.

SUMMARY OF THE INVENTION

Briefly stated, the invention contemplates the provision of an improved vending device capable of dispensing individual beverage cups incorporating a soluble component, selectively from one of a plurality of stacks, each stack containing cups having a particular type of such soluble components. As contrasted with prior art devices, the cups are positioned in inverted condition within a stack, and are dispensed in such inverted position from the top of the stack, rather than from the bottom. A selectively positioned claw mechanism is employed for this purpose, the claw delivering an engaged cup to fall upon a chute structure carrying the same to a location where it may be manually engaged for subsequent filling with a liquid. With the removal of a cup from the top of a given stack, the stack is elevated to position the next succeeding inverted cup of the stack within the path of movement of the claw mechanism, so that the operation may be repeated. Each stack is supported upon a housing between a pair of oppositely positioned threaded rods. A small electric motor is positioned within the housing, and rotates two internally threaded gears, each of which engages a threaded rod. Power for operating the motor is supplied through the threaded rods, and through the threaded gears via suitable collector bearings to the motor. A central driving gear on the shaft of the motor is made of insulative material to preclude short circuiting of the electrical current prior to its entry into the motor. The stacks of cups are arranged in rectilinear fashion within a console, so as to occupy a minimum of space against the wall of a room. Should any one stack mechanism fail, it may be conveniently removed and replaced during a normal servicing operation.

A principal object of the invention therefore is to provide a vending machine for dispensing containers partially filled with a soluble food or beverage component which is maintained in a sanitary condition until the container is delivered to a user.

A further object of the invention is to facilitate the dispensing of containers partially filled with a soluble food or beverage component from a machine activated by a consumer by depositing a coin therein.

A still further object of the invention is to provide an improved stacking of containers partially filled with a soluble food or beverage component in a machine adapted to dispense such containers upon deposit of a coin.

Another object of the invention is to facilitate servicing of a machine for dispensing upon insertion of a coin of containers partially filled with a soluble food or beverage.

Yet another object of the invention is to provide a coin operated vending machine for selectively dispensing containers partially filled with solid or beverage components which is simple to operate and service.

These and further objects of the invention will appear as the specification progresses.

A particular embodiment of the invention, shown in the accompanying drawing will now be described.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
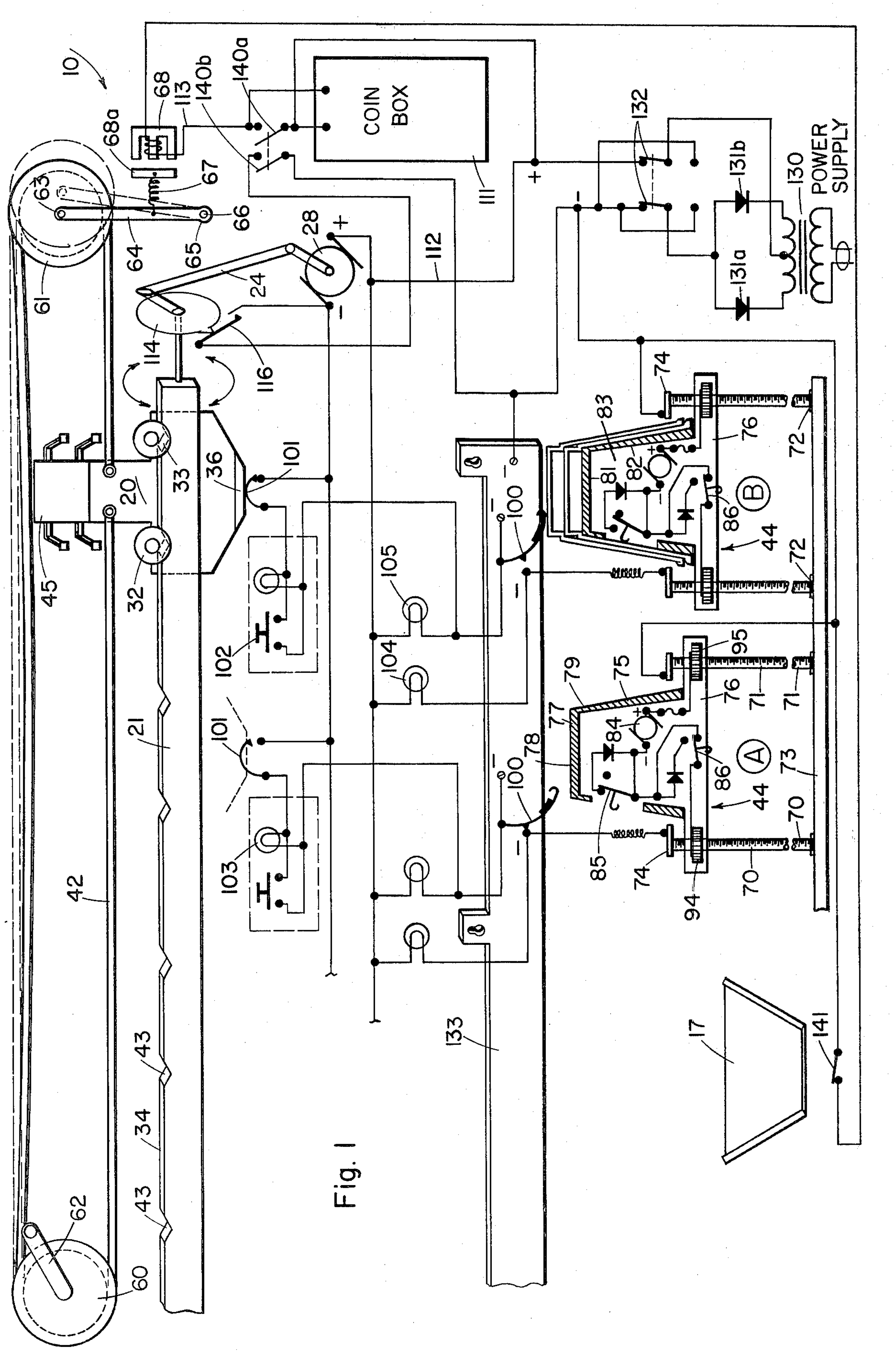
FIG. 1 is a fragmentary schematic front elevational view of an embodiment of the invention.

In accordance with the invention, the device, generally indicated by reference character 10, is contained within a casing element or console 11 of generally rectilinear configuration. The casing element 11 includes a front wall 12, a top wall 13, a rear wall 14, a pair of side walls, one of which is indicated by reference character 15, and a lower wall (not shown). A V-shaped chute 17 is carried by the inner surface of the front wall 12 for the purpose of guiding dispensed cups (not shown) to an opening 18 in the front wall 12 for manual retrieval.

Figure 3:
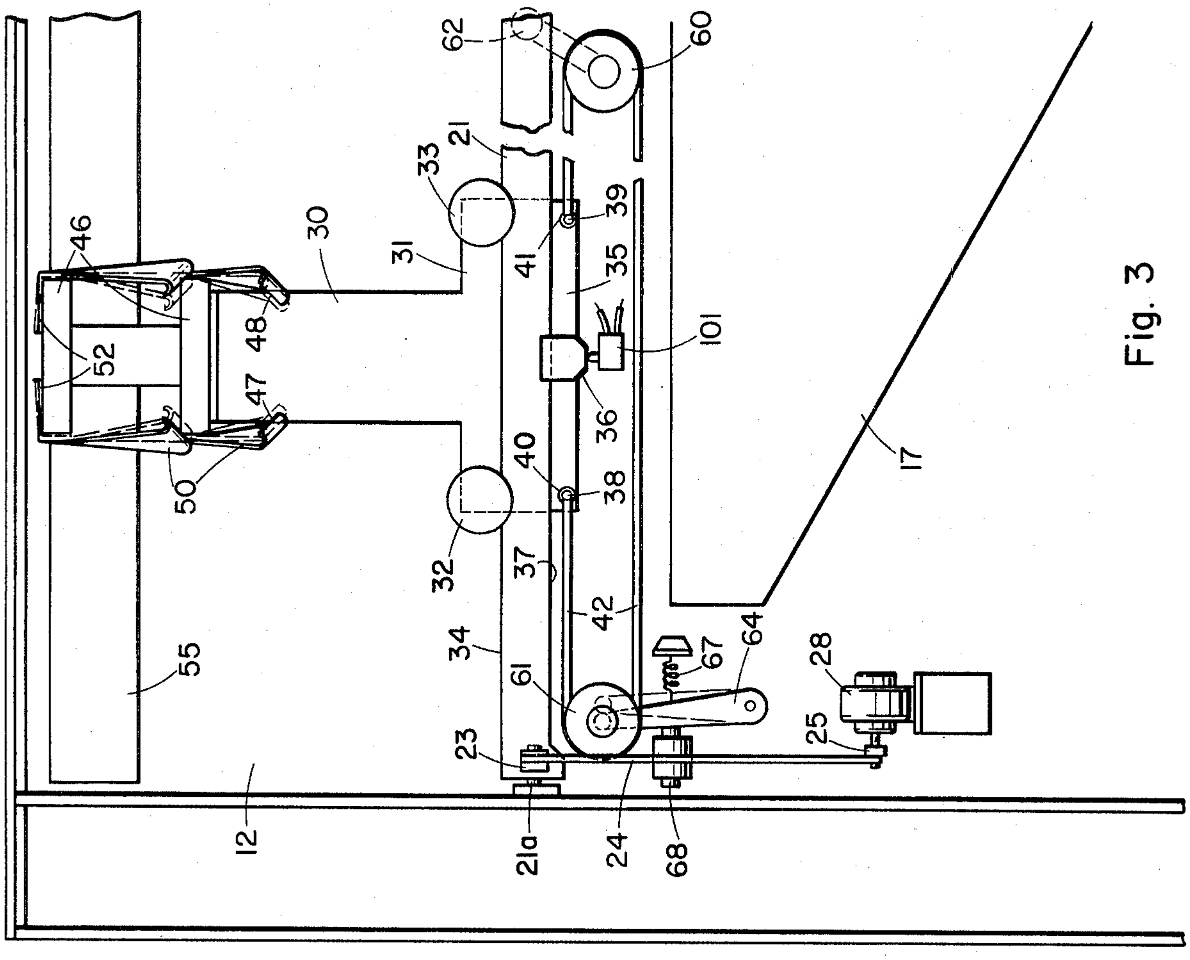
FIG. 3 is a fragmentary rear elevational view thereof.
Figure 2:
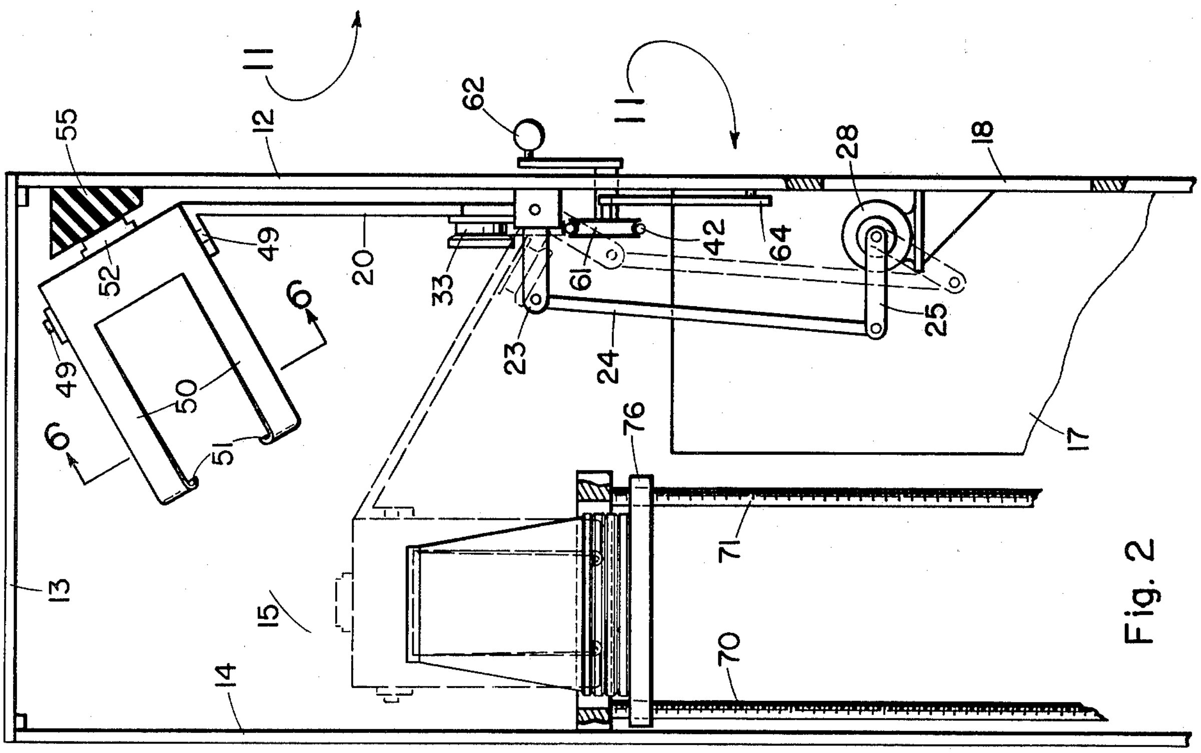
FIG. 2 is a fragmentary sectional view thereof, as seen from the right hand portion of FIG. 1.
Figure 5:
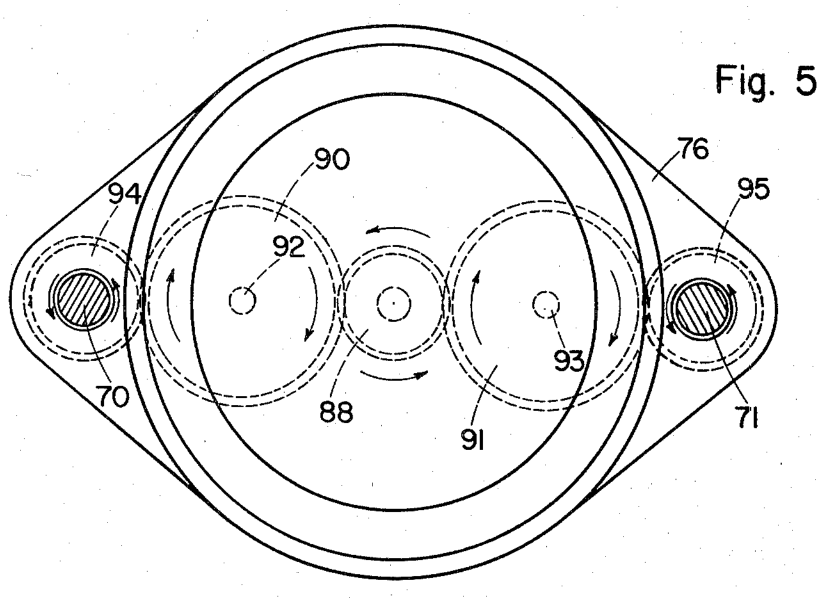
FIG. 5 is a top plan view as seen from the upper portion of FIG. 4.
Figure 4:
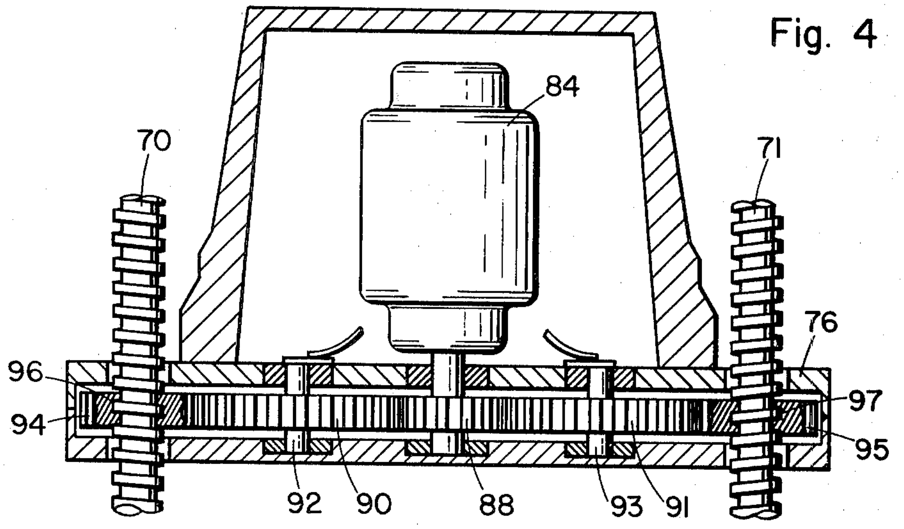
FIG. 4 is a sectional view showing the mechanical aspects of one of the stack advancement mechanisms.

Referring to FIGS. 1 and 3, a transversely positionable claw element 20 is supported for rectilinear movement on a tiltable carrier tract 21 supported by pins 21*a* at the ends thereof, extending into interior vertical walls, one of which is indicated by reference character 22 (FIG. 3). The track 21 is actuated during each cycle through a lever 23 pivoted to a connecting rod 24, in turn connected to a crank member 25 driven by an electric motor 28, which causes the track to tilt a claw element 20 to execute a nutating movement and pick up a selected cup.

The claw element 20 includes a carrier member 30, a medially positioned portion 31 of which supports first and second guide wheels 32 and 33, respectively, which engage the upper edge 34 of track 21. A lower extension 35 mounts a sliding shoe 36 which engages the lower edge 37 of track 21. Pin means 38 and 39 engage the looped terminals 40 and 41 of a cable 42 for transverse movement of the carrier member 30. The upper edge 34 of track 21 is provided with plurality of detents 43 which serves to position the carrier member 30 relative to any one of a plurality of stack units 44 (FIG. 1).

Figure 6:
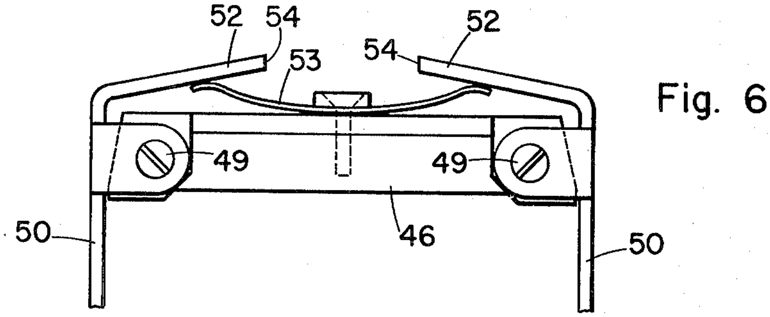
FIG. 6 is a sectional view of a claw mechanism, as seen from the plane 6—6 in FIG. 2.

The upper portion 45 of the carrier member 30 includes a bracket 46 for mounting first and second claw members 47 and 48, respectively, for pivotal movement on pintles 49. The claw members 47–48 are similar, each including pairs of arms 50 having jaws 51 thereon extending laterally therefrom. Release cams 52 are urged by a spring 53 (FIG. 6) to move the jaws 51 to a closed condition. The ends 54 of the cam arms 52 selectively contact a release block 55 carried by an inner surface of the casing element 11 at the completion of a cycle, to cause the jaws 51 to open and release an engaged cup. During the engagement of a cup, the jaws are cammed outwardly by contact with the outer surface of the conical body of the cup until the open end of the cup is reached, at which time the jaws snap around the free edge thereof.

The cable 42 is entrained about first and second pulleys 60 and 61, respectively. The pulley 60 mounts a hand crank 62 positioned outwardly of the casing element 11 for manual manipulation. The pulley 61 is mounted on a first end 63 of a generally vertically oriented link 64, the lower end 65 of which is fixedly mounted upon a pintle 66. A medially positioned spring 17 tenses the cable 42, the force of the spring being periodically overcome by actuation of an electromagnet 68 which moves armature 68*a* during a given cycle. When tension on the cable is relaxed, sufficient slack is provided to permit the carrier member 30 to pivot on track 21.

The individual stack units 44 are substantially similar, and accordingly, a detailed description of one such unit will serve to describe all. Each unit includes first and second threaded rods 70 and 71, respectively, the lower ends 72 of which are engaged and supported by a horizontal wall 73. The upper ends 74 are suitably anchored by means (not shown), so that the rods are constrained to vertical orientation.

A housing element 75 is supported on the rods 70 and 71 and includes base plate 76 underlying a conically shaped dome member 77, the outer surfaces 78 and 79 of which conform to the interior of an inverted cup. The inner surfaces 81 and 82 define a chamber 83 accommodating a small electric motor 84, a "last cup" switch 85 and a bottoming switch 86. The motor is mounted upon the base plate 76 such that the output pinion shaft 43 thereof, which may be of a phenolic resin or similar material, may simultaneously engage inner gears 90 and 91 which are supported for rotation about a vertical axis by pintles 92 and 93, respectively. The inner gears mesh with corresponding outer gears 94 and 95, each of which is provided with a threaded central bore at 96 and 97, the threads of which engage the outer threaded surface of the rods 70 and 71, respectively. From a consideration of FIG. 1, it will be apparent that engagement of the housing element 75 upon the rods 70 and 71 limits movement thereof to that along a vertical path under impetus provided by the motor 84. This movement will be in the form of upward increments under the control of a positioning switch 100.

Each stack unit also includes a selector switch 101 which is normally open, and is closed by contact of the carrier shoe 36 which contacts a feeler when the carrier is in position directly over the stack unit. A manually operated switch 102 and associated lamp 103 is operative only when the carrier is properly positioned, as indicated by the illumination of the lamp 103. An "empty" light 104 is under the control of the last cup switch 85, which serves to warn the user to make a selection other than that corresponding to the present position of the carrier member 30. Closing the switch 102 illuminates a legend light 105 confirming the selection of the user, and commencing a cycle.

Transformer 130 and rectifiers 131A and 131B comprise a power supply which is connected to a double pole throw "reloading switch" 132 with "up" and "down" positions. In this drawing the reloading switch is in the "up" position. In this "up" position, positive current is supplied to all of the threaded rods 71. At the same time negative current is supplied to switch-bearing plate 133. An electrical connection is made from the switch-bearing plate to the center of each of the single pole double throw switches marked 100. When any stack of cups is low, the weight on the actuating arm of that particular switch 100 will allow it to supply negative current (through the spring contact) to that particular rod 70. This, in turn, causes that D.C. motor to run. The D.C. motor turns the threaded gears on threaded Rods 70 and 71, which in turn raises the stack of cups until switch 100 no longer supplies current to rod 70 and then the motor stops. The switch 100 now supplies negative current to the "legend" light 105 and to the "selection button" 101. The other side of the "legend" light is tied to the positive side of the power supply and, therefore, it is lighted. If there were no more cups to be sold (as is the case in stack #8), then "legend" light 105 would not light and the "empty" light would go on. Of course, energy would again be supplied to rod 70, but this motor would not run because the rectifier in the circuit of switch 100 would only be able to supply positive current to the minus side of that D.C. motor.

When a coin is dropped into the coin box 111 the following series of events takes place.

The coin actuated switch is only "on" momentarily. During this momentary "on" position it bridges switch 140. This energizes the electromagnet 68 which pulls the armature 68*a* against the magnet and this, in turn, holds switch 140A closed. This action also closes switch 140B. The armature also pulls on the spring 67 which pulls on the idler pulley 10 thus putting tension on the cable. The increased tension tightens the cable into the groove on the manual pulley 60. The operator can now turn the crank 62 and move the carrier 21 into any selective position so that the claws on the carrier are directly over any desired stack of cups. When the carrier is directly over any stack of cups, the carrier wheels 32, 33 will drop into notches 43 in the carrier track. The notches in the carrier track serve as a positive "detent" and they also allow the carrier to actuate only that particular selection button. It also causes that particular selection bulb to glow because that selection bulb is now in series with the camming motor 28.

The current through the selection light is insufficient to turn the camming motor.

If the customer presses that particular selection button, then the cam-switch 116 is bridged and this starts the camming motor 28. The camming motor tilts the carrier track 21 and the claw element 20 picks up a selected cup. When the carrier track straightens up again, the claws are forced to drop the selected cup into the delivery chute 17. At that time the camming motor has completed its cycle. It opens the cam-switch 116 and, of course, the camming motor 28 stops in the same position from which it started. When the selected cup drops through the delivery chute 17 it momentarily opens the delivery-actuated switch 141. This interruption allows the armature 68*a* to pull away from the magnet 68 which releases the tension on the cable so that no one can move the carrier around on the carrier track. It also opens switch 140 so that the camming motor 28 cannot be actuated and the machine is now in "safety" condition.

When the owner-operator decides to refill the depleted stacks he simply places the reloading switch 132 into the DOWN position. When this is done, all of the D.C. motors will run in reverse and all of the stacks will descend until the switches 101 hit the floor of the vending machine. This throws those switches into the only up position. The owner-operator can now add new cups to all of the stacks. When the stacks are filled, the reloading switch 132 is again placed in the "up" position. All of the stacks will now rise until the limit switches 100 stop them. The machine is again ready for vending operation.

It will be observed that the forces exerted by jaws 51 are exerted directly at the point at which the uppermost cup is joined to the next lower cup nested therein, so that the seal may be broken quickly, without distorting the cup in any manner. While a variety of cups may be used, most satisfactory operation will be obtained using cups of the type disclosed in my co-pending application Ser. No. 761,056, filed Jan. 21, 1977 now Pat. No. 4,096,947, where clearance is provided between nesting cups except in the sealing area adjacent the mouth of the cup.

Should, for any reason, the motor of a particular stack unit be inoperative, it will not elevate the uppermost cup to proper position for retrieval, and the position switch 100 will remain open preventing the legend light 104 from illuminating, and thereby advising the operator to shift the carrier member 30 to another stack unit for another selection.

It will be observed that cup dispensing is obtained with a minimum of mechanical and electrical components, owing to the fact that a single carrier member 30 moving the jaws 51 is used for each of the stack units. Because the claw element 20 moves in a horizontal rectilinear fashion along the rail 21, the stack units can be positioned in a single rank, enabling the console to have relatively minimum depth, ideally adapting it to be positioned along a vertical wall with minimum occupation of available space. By merely disconnecting the rods 70 and 71 of any given stack unit, the entire unit can be removed and replaced as a field service operation, and inoperativeness of any one stack unit will not disable the entire device.

The foregoing description of a particular embodiment is not limitative since obvious modifications will occur to those skilled in the art to which the invention pertains.

I claim:

1. A device for dispensing cups maintained in inverted condition in a vertically oriented stack comprising: a horizontally oriented track member, a claw element upon said track member, said claw element including a carrier member, at least one pivotally mounted resiliently urged jaw carried by said carrier member, means for imparting arcuate movement to said track member to tilt said track about the horizontal axis thereof and cause nutating movement of said claw element, thereby bringing said jaw into cup engaging position substantially at one end of said path of movement, and means for opening said jaw to release an engaged cup substantially at the opposite end of said path of movement.

2. A device as set forth in claim 1, including means for adjustably locating said claw element at predetermined positions along the horizontal axis of said track member.

3. A device in accordance with claim 1, including a plurality of stack units, each supporting a stack of cups in inverted nested condition, said stacks of cups being arranged in a row the axis of which is parallel to that of said track member; said stack units each including means for incrementally elevating said stack to position the uppermost cup thereof within the path of travel of said claw element.

4. A device in accordance with claim 1, wherein said track member has a plurality of detents therealong, said claw element having means cooperating with said detents to selectively position said claw element in the area of a particular stack unit.

5. A device as claimed in claim 3 wherein the means for incrementally elevating the stack to position the uppermost cup within the path of travel of the claw element includes a pair of threaded parallel rods, and motor means for rotating the threaded rods to elevate the stack.

6. A device a claimed in claim 5 including switch means responsive to the stack condition to elevate the stack when said stack is below a predetermined level.

7. A device as claimed in claim 1 wherein the track tilting means is a camming motor coupled to the track.

8. A device as claimed in claim 1 wherein the claw member is supported by a pair of spaced parallel rods which are supported by said track.

9. A device for dispensing cups maintained in inverted condition in a vertically oriented stack comprising: a horizontally oriented track member, a claw element upon said track member, said claw element including a carrier member, at least one pivotally mounted resiliently urged jaw carried by said carrier member, means for imparting a nutating path of movement to said carrier member to bring said jaw into cup engaging position substantially at one end of said path of movement, and means for opening said jaw to release an engaged cup substantially at the opposite end of said path of movement; said device further including a plurality of stack units, each supporting a stack of cups in inverted nested condition, said stacks of cups being arranged in a row the axis of which is parallel to that of said track member; said stack units each including means for incrementally elevating said stack to position the uppermost cup thereof within the path of travel of said claw element; and said means for incrementally elevating the stack to position the uppermost cup within the path of travel of the claw element includes a pair of threaded parallel rods, and motor means for rotating the threaded rods to elevate the stack.

10. A device for dispensing cups maintained in inverted condition in a vertically oriented stack comprising: a horizontally oriented track member, a claw element upon said track member, said claw element including a carrier member, at least one pivotally mounted resiliently urged jaw carried by said carrier member, means for imparting a nutating path of movement to said carrier member to bring said jaw into cup engaging position substantially at one end of said path of movement, and means for opening said jaw to release an engaged cup substantially at the opposite end of said path of movement; said track member having a plurality of detents therealong, said claw element having means cooperating with said detents to selectively position said claw element in the area of a particular stack unit; and wherein the means for imparting a nutating movement to the carrier member includes means for tilting said track member.

11. A device as claimed in claim 10 wherein the track tilting means includes a camming motor coupled to the carrier track.

12. A device as claimed in claim 11 wherein the claw member is supported by a pair of spaced parallel rods which are supported by said carrier track.

* * * * *